United States Patent [19]

Mattson

[11] Patent Number: 4,673,076
[45] Date of Patent: Jun. 16, 1987

[54] ROTARY SHUTTLE FOR MACHINE TOOLS

[75] Inventor: Clyde E. Mattson, Waukesha, Wis.

[73] Assignee: Kearney & Trecker Corporation, West Allis, Wis.

[21] Appl. No.: 647,116

[22] Filed: Sep. 4, 1984

[51] Int. Cl.[4] .............................................. B65G 47/00
[52] U.S. Cl. ................................ 198/346.2; 198/346.1; 198/950; 414/744 R; 414/786
[58] Field of Search ............... 414/222, 223, 225, 736, 414/744 R, 744 A, 749, 590, 786; 198/339, 414, 472, 950, 346.1, 346.2, 339.1; 29/33 P, 563; 409/134

[56] References Cited

U.S. PATENT DOCUMENTS

| 3,045,802 | 7/1962 | Miller, Jr. ...................... 198/414 X |
| 3,576,540 | 4/1971 | Fair . |
| 3,825,245 | 7/1974 | Osburn et al. . |
| 3,986,617 | 10/1976 | Blomquist . |
| 4,205,216 | 5/1980 | Douglas ........................ 198/950 X |
| 4,373,840 | 2/1983 | Miller, Jr. . |
| 4,501,527 | 2/1985 | Jacoby et al. ...................... 414/225 |
| 4,536,124 | 8/1985 | Silvestri .......................... 414/744 R |

Primary Examiner—Robert J. Spar
Assistant Examiner—Donald W. Underwood
Attorney, Agent, or Firm—James O. Skarsten

[57] ABSTRACT

A rotary shuttle (10) for a machine tool (11) in which no power mechanism is required for moving the pallet (14, 15) with the workpiece off of the shuttle (10) and on to the machine tool worktable (13A) or for withdrawing a pallet (14, 15) with the completed workpiece on it off of the machine tool worktable (13A) and back on to the shuttle (14, 15). A rotatable shuttle (10) is presented with a workpiece support which can also be raised and lowered with pallets (14, 15), which in conjunction with an indexing table (13) moves workpieces between the worktable (13A) and a workpiece support (16, 19). A frame (66) of the shuttle mechanism (10) includes an offset rotatable section (65) which is arranged to extend over a portion (79) of the indexing table (13) with the shuttle mechanism (10) including support arms (16, 19) in conjunction with the offset rotatable section (65) to extend over a portion of the indexing table (13). In this manner, the rotation as well as raising and lowering of the workpiece support can effect the placement of a workpiece from the workpiece support on to an indexing table as well as removal therefrom of the workpiece which has been operated on without the requirement of a power mechanism for moving a pallet (14, 15) between the workpiece support (16, 19) and the indexing table (13).

2 Claims, 17 Drawing Figures

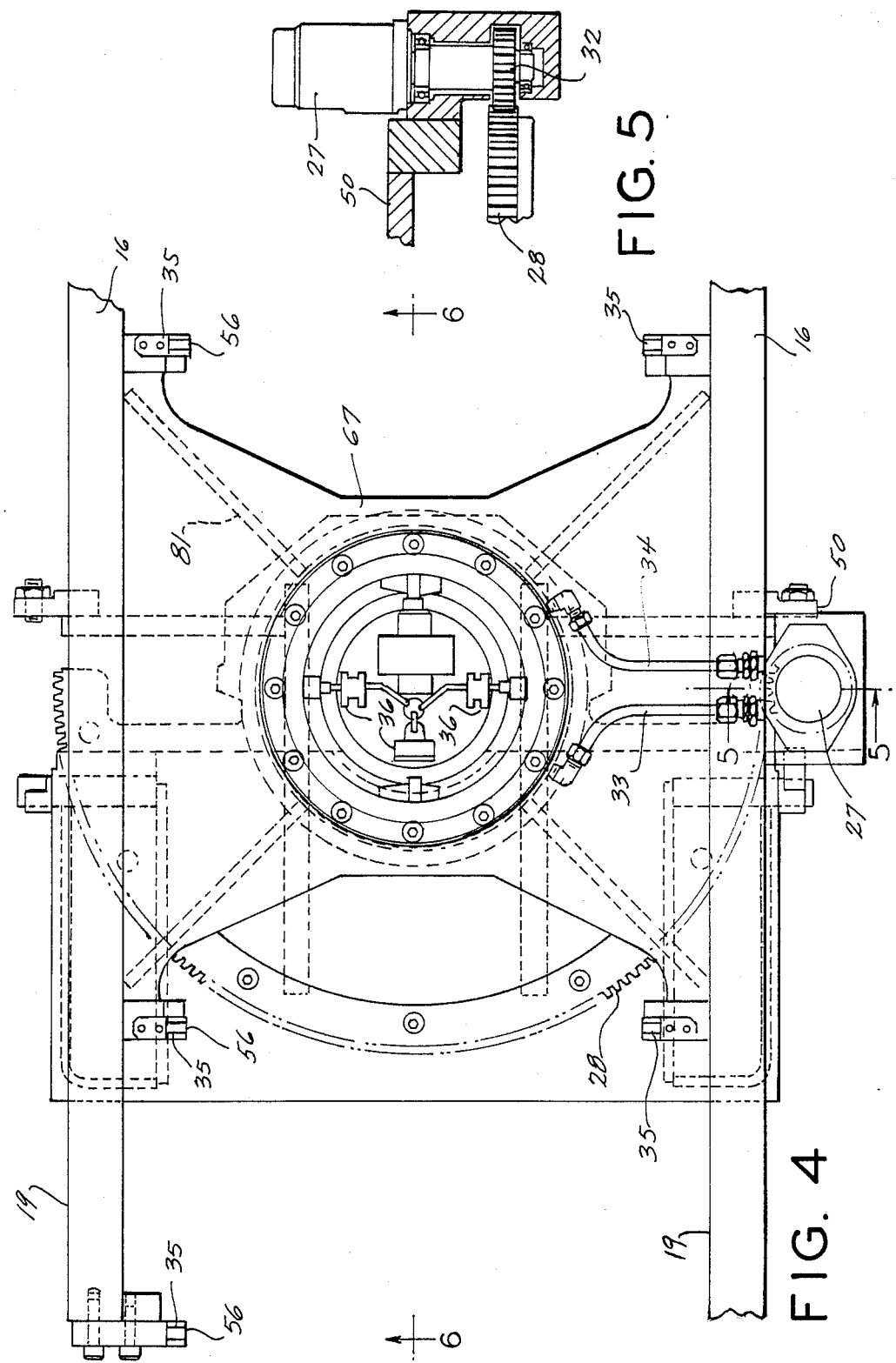

ROTARY SHUTTLE FOR MACHINE TOOLS

BACKGROUND OF THE INVENTION

This invention relates to a shuttle mechanism for a machine tool, and more particularly to an improved rotary shuttle mechanism for a machine tool which can exchange workpieces between a shuttle and an operating station without the requirement of a power mechanism for moving the pallet between the workpiece support and an indexing table for the operating station.

Representative of shuttle mechanisms or pallet transfer systems are those disclosed in the following U.S. Pat. Nos. 3,825,245 entitled Workpiece Changer Mechanism For A Machine Tool, issued July 23, 1974; 3,986,617 entitled Indexing Pallet Carrier For Machine Tools, issued Oct. 19, 1976; and 4,373,840 entitled Pallet Transfer System, issued Feb. 15, 1983. In all of the shuttle mechanisms disclosed in these patents for transferring a workpiece from a workpiece storage support to an indexing table in conjunction with a machine tool center, there is some sort of power mechanism for moving the workpiece on a pallet off of the workpiece support and on to the indexing table. For example, this is illustrated in U.S. Pat. No. 3,825,245 by a cylinder (61) which is actuated to effect movement of a piston rod (59) for purposes of moving a latch (91) into an outward engaged position with a pallet (30). An indexing table then releases pallet (30) by urging it upwardly into clamped engagement with latch 91 of the outwardly extending piston rod (59) which is then retracted to move the latched pallet (30) into parked storage station 47a. In U.S. Pat. No. 3,986,617, a bi-directional rotary hydraulic motor (98) which is connected to a shaft (99) and extends entirely across the pallet changer drives the rails (85) through a conventional rack and pinion mechanism for a similar purpose. A clamp-type brake (100) which is normally spring urged into gripping engagement with a shaft (99) is employed to lock the rails in place except when a pallet change is to be made. In U.S. Pat. No. 4,373,840 a reciprocal latch device (85) is provided to draw a pallet (82) on to a ram (81) and over guide ways (120 and 121). The reciprocating latch motion is effected by a ball screw (125) which can be rotated through appropriate gearing (126) by hydraulic motor (127) or other means.

In addition to eliminating mechanisms in the shuttle for the transfer of the workpiece from the workpiece support to the indexing table, it should be pointed out that rotary shuttles of the type described herein normally require more floor space than a linear shuttle. However, in the rotary shuttle of the present invention, less floor space is required.

It is an advantage of the present invention to provide an improved shuttle mechanism for a machine tool which eliminates the need for a power mechanism to move the workpiece from the workpiece support and on to the indexing table.

It is yet another advantage of the invention to provide improved shuttle mechanisms which require a minimum amount of space and are easily accommodated by the indexing table of the machine tool center.

BRIEF SUMMARY OF THE INVENTION

Briefly, in accordance with the illustrated embodiment of the invention, an improved shuttle mechanism and method of use is provided for a machine tool center having a worktable for receiving the workpieces to be operated on. The improved shuttle mechanism includes a workpiece support which is rotatably mounted in a frame for storing workpieces. Raising and lowering means are operatively associated with the workpiece support and the frame to rotate as well as raise and lower the workpiece support. The raising and lowering means in conjunction with an indexing table moves the workpieces between the worktable and the workpiece support. In the usual manner, the indexing table means includes a linearly movable table for movement between the workpiece support and the machine tool. In the preferred embodiment, the rotating means includes a gear operatively connected to the frame of the shuttle mechanism and engaged by a drive pinion and the raising and lowering means includes a piston and a cam ring with pressurized fluid means to move the piston and the ring with respect to a carriage housing. Also, the frame of the shuttle mechanism includes an offset rotatable section which is arranged to extend over a portion of the indexing table. The rotating and the raising and lowering means associated with the workpiece support is the only mechanization required for moving a pallet associated with the workpiece support on to the indexing table. Accordingly, there is no power mechanization required for moving the pallet with the workpiece off of the workpiece support as it will be lowered on to the indexing table with a lowering of the lowering means. In addition, a gate member is mounted in conjunction with the workpiece support and would be rotatable therewith to close a doorway in an enclosure for the machine tool station so as to prevent debris from entering into the area occupied by the workpieces carried on the workpiece support.

BRIEF DESCRIPTION OF THE DRAWINGS

The features of this invention believed to be novel, set forth with particularity in the appended claims; the invention itself, however, both as to organization and method of operation, together with further advantages thereof, may best be understood by reference to the following description taken in conjunction with the accompanying drawings in which:

FIG. 4 is a top fragmentary view showing the support arms of the rotary shuttle mechanism of this invention;

FIG. 5 is a view in vertical section taken along line 5—5 of FIG. 4;

Referring now to the drawings and specifically FIGS. 1 and 2, there is shown in FIG. 1 a perspective view of the rotary shuttle mechanism 10 in conjunction with a machine tool generally 11. As shown in FIG. 2, the machine tool 11 comprises a principal horizontal bed 12 on which is supported an indexing table 13 for carrying pallet 14 along the usual Z axis in conjunction with upstanding vertical column 22. The motion along the Z axis is provided by a stationary nut 18 mounted on horizontal bed 12 which receives a screw 17 driven by a hydraulic motor 20. The machine tool 11 includes the usual tool receiving spindle 21 rotatably joined in the spindle head 24. To provide the usual vertical or Y axis of movement, the vertical column 22 is provided with the usual parallel spaced vertically upstanding ways one of which is shown at 23 in FIG. 1. The horizontal tool receiving spindle 21 is rotatably journalled in the spindle head 24 for selective rotatable power driven movement. To perform a machining operation on a workpiece (not shown) secured to the pallet 14 a milling cutter (not shown) carried by the tool spindle 21 is selectively movable in the known manner by effecting relative bodily movement between the spindle 21 and the pallet 14. The usual power driven transmission (not shown) are connected in a well-known manner to effect selective rotation of the tool spindle 21. Vertical movement of the spindle head 24 along the Y axis is afforded by the Y axis drive 73. The third or X axis of relative movement is effected over an X axis bed 25 by means of a common drive mechanism of the ball screw type. Positioned at the front of the machine tool 11 is the rotary shuttle mechanism 10 generally having opposing shuttle arms such as 16 for supporting the pallets 14 and 15.

Figure 2:
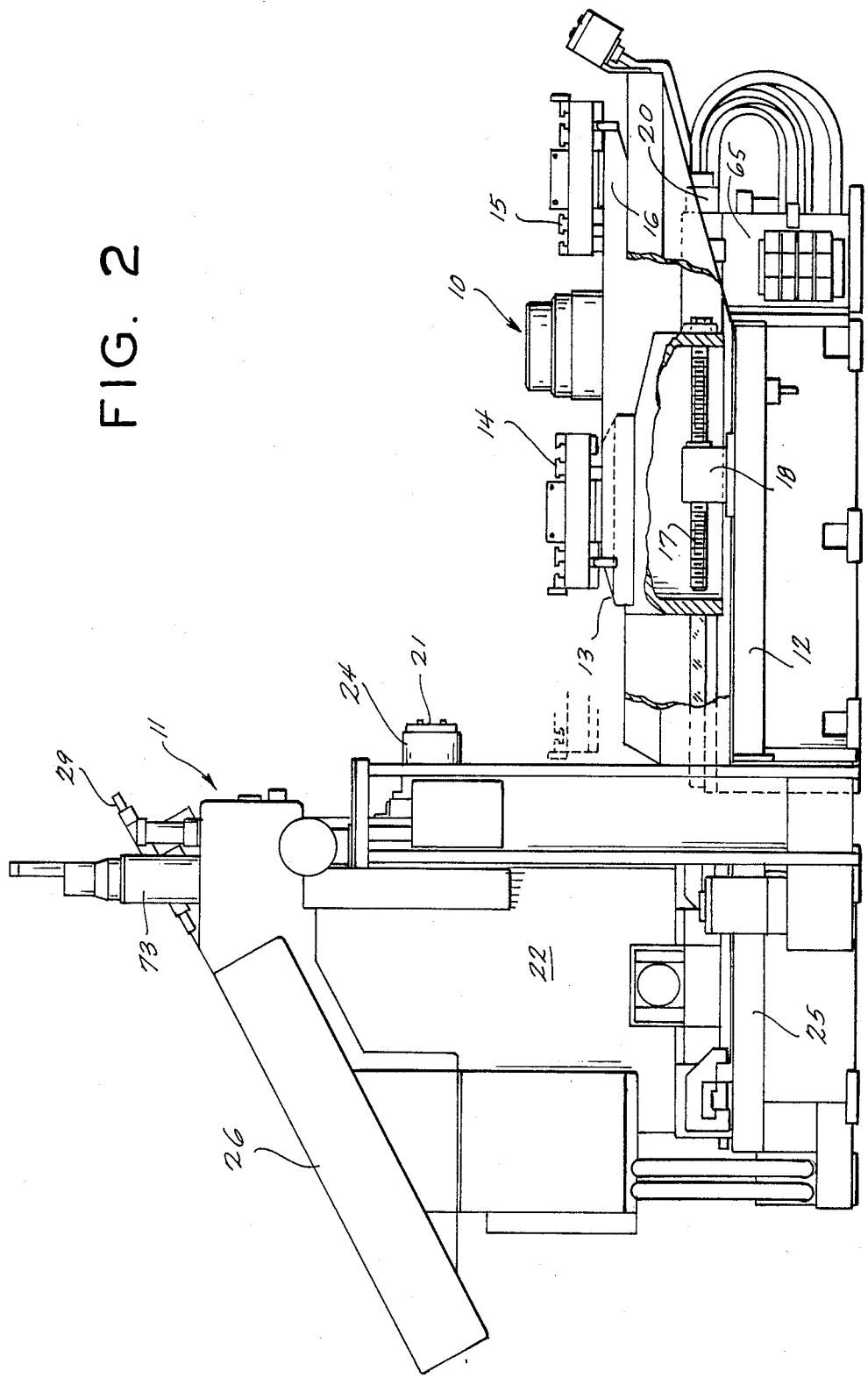
FIG. 2 is a view in side elevation of a machine tool incorporating the present invention.
Figure 3:
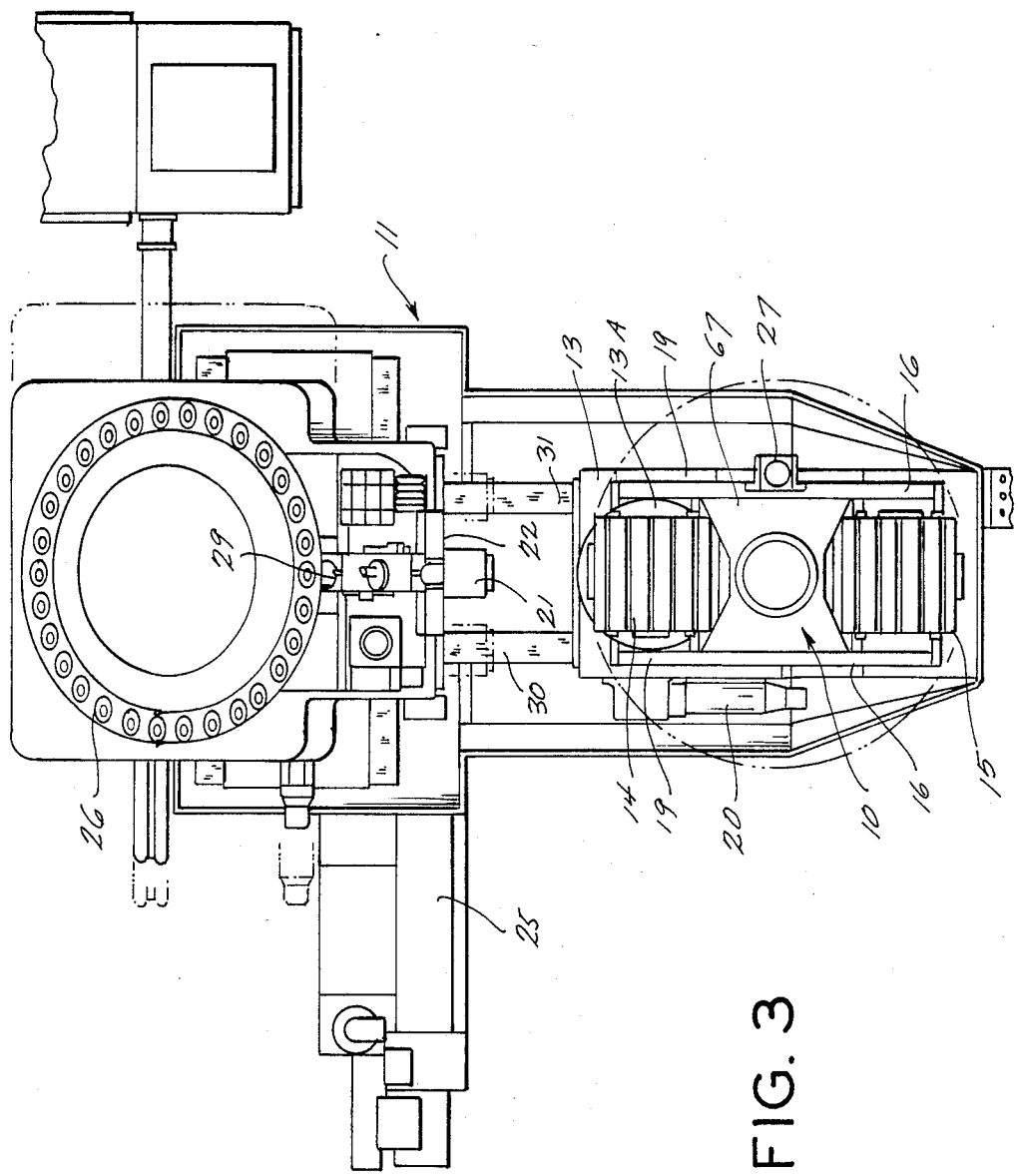
FIG. 3 is a top plan view illustrating a machine tool and the rotary shuttle mechanism of this invention.

Referring both to FIGS. 2 and 3, it will be seen that the machine tool 11 includes a tool storage magazine 26 of the rotary type and a tool changer 29 for interchange of tools between the tool storage magazine 26 and the tool spindle 21. As best seen in conjunction with FIG. 3, the horizontal ways 30 and 31 are provided for an index table 13 for guiding it over the Z axis and in the direction of the vertical column 22. Referring to the shuttle mechanism 10 and specifically to FIG. 3, it will be seen that it has a pair of opposing, work supporting shuttle arms 16 and 19 for supporting pallets 14 and 15.

The precise location of the pallets 14 and 15 on the shuttle arms 19 and 16 as well as the rotation of shuttle mechanism 10 is illustrated in FIGS. 4 and 5. The shuttle arms 16 and 19 will have extended therefrom two pairs of locator elements 35 having projections 56 for engagement with locators on the underside of the pallets 14 and 15. This will be later described in conjunction with FIG. 11. The support arms 16 and 19 are interconnected by a frame structure 81 to which is secured hydraulic rotating motor 27 which will be mounted to the frame structure 81 by means of a bracket 50. A drive pinion 32 driven by motor 27 will intermesh with the shuttle gear 28 which is secured to the shuttle base 66 (See FIG. 1). The shuttle gear 28 will have an arc of approximately 180° and the drive pinion 32 will ride thereover in a reciprocating manner. The usual pressurized fluid will be interconnected to the rotating motor 27 by means of the hydraulic lines 33 and 34 which in turn will be pressurized by the usual fluid pump (not shown). It will be seen that there is provided proximity switches 36 in the center section 67 of the shuttle mechanism for the purpose of locating the shuttle mechanism as it is moved through an arc of 180°. The usual controls (not shown) will be utilized for this purpose.

Figure 6:
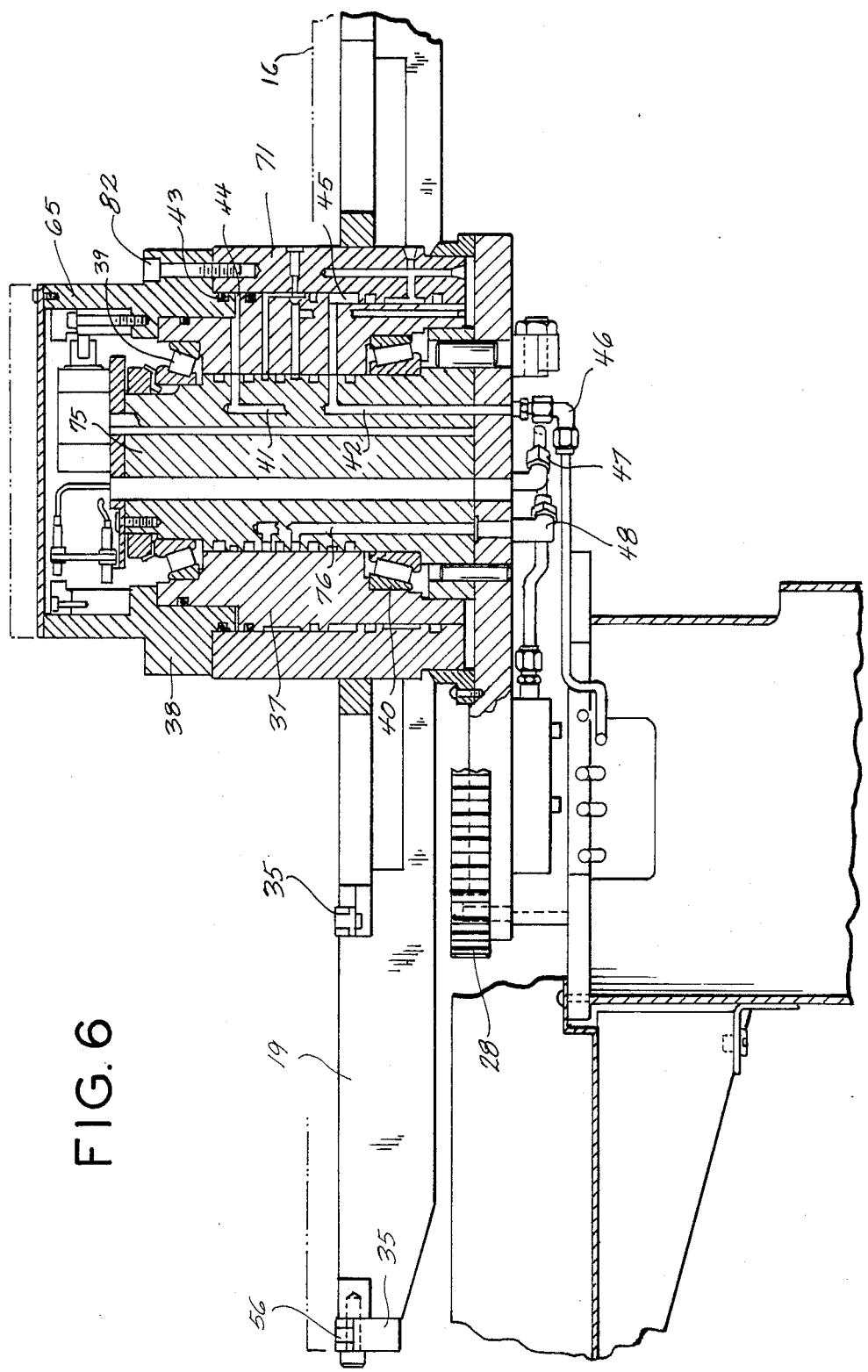
FIG. 6 is a view in vertical section taken along line 6—6 of FIG. 4.

In FIG. 6, the raising and lowering means for lifting the work support arms such as 19 and 16 is described. A central core section 75 is provided which will have fluid channels such as 41 and 42 therein and in communication with hydraulic lines 46 and 47. An additional hydraulic channel 76 and line 48 are provided for the purpose of supplying hydraulic fluid to one of lines 33 and 34 for the hydraulic motor 27. A piston 37 is rotatably mounted over central core section 75 by means of bearings 39 and 40 and has fluid channels therein continuing with channels 41 and 42. A cam ring 38 is secured to a shuttle carriage 71 by a screw 82. Openings 44 and 45 are provided between the cam ring 38 and the piston 37 as well as between the piston 37 and the shuttle carriage 71 for purposes of raising and lowering the shuttle carriage 71. It will be seen that when hydraulic fluid is introduced into the opening 44 the presence of fluid therein will cause the cam ring 38 and consequently the shuttle carriage 71 to move upwardly. When the fluid line 41 is vented and hydraulic fluid is introduced into the fluid channel 42 and accordingly into opening 45 this will cause shuttle carriage 71 to move downwardly. As shuttle arms 19 and 16 are integrally connected to the shuttle carriage 71 this motion is then translated to these arms.

Figure 7:
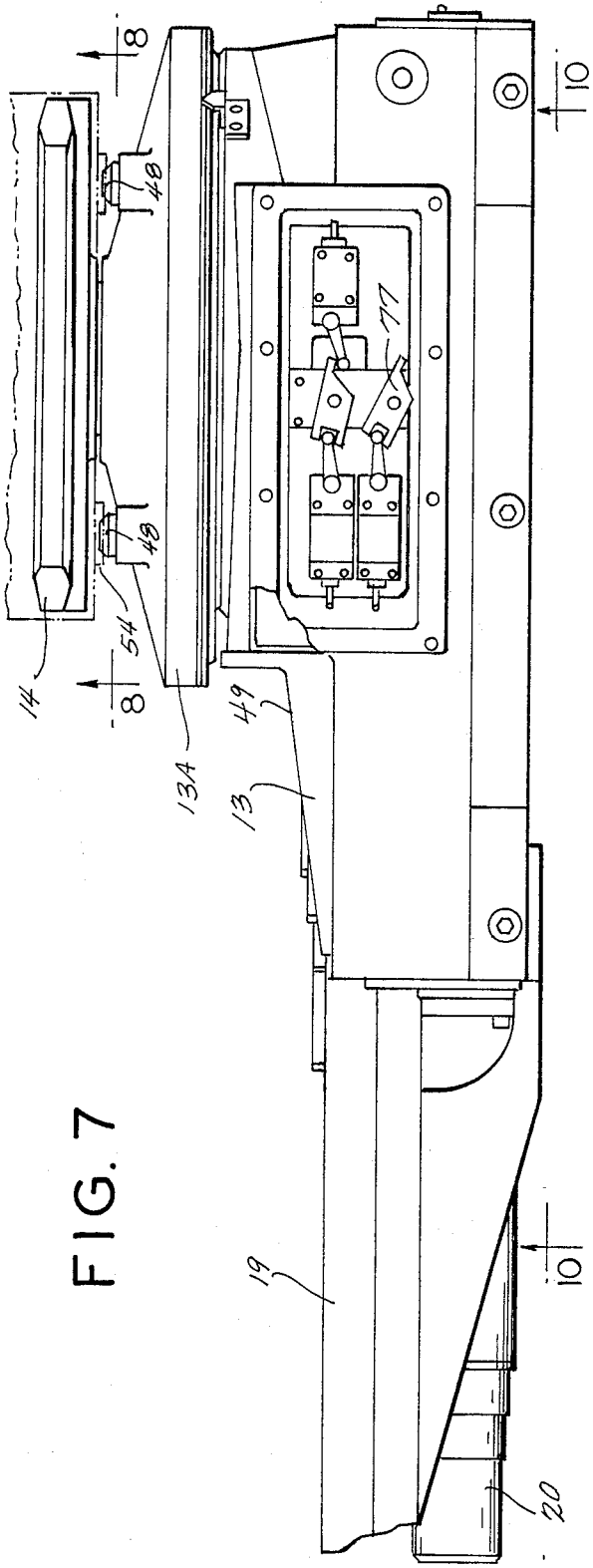
FIG. 7 is a view in side elevation of the indexing table utilized in conjunction with the rotary shuttle mechanism of this invention.
Figure 9:
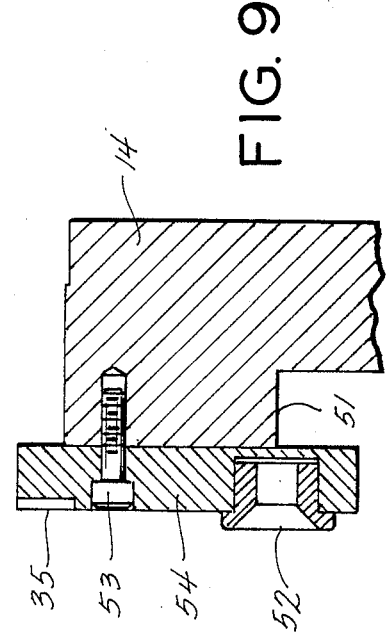
FIG. 9 is a view in vertical section taken along line 9—9 of FIG. 8.
Figure 8:
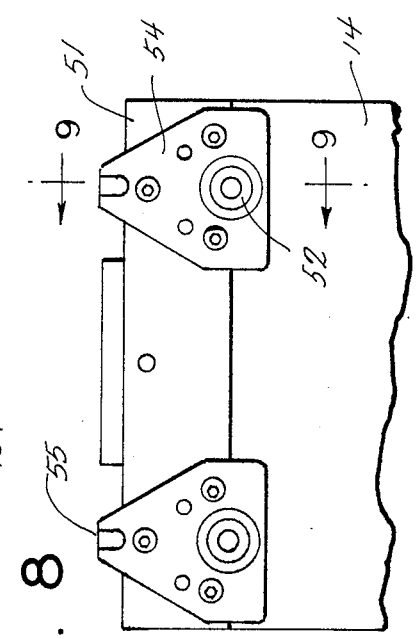
FIG. 8 is a view in horizontal section taken along line 8—8 of FIG. 7.
Figure 11:
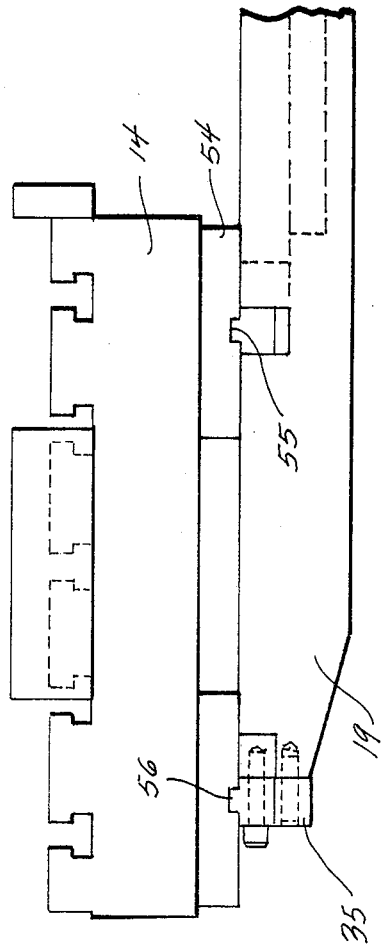
FIG. 11 is a fragmentary view in side elevation showing the locating feature of the rotary shuttle in conjunction with a pallet.

Referring to FIG. 7, it will be seen that the index table 13 includes a base portion 49 from which extends table 13A for carrying pallet 14. Four cone-like locators, two of which are shown at 48 extend upwardly therefrom and engage complementary receiving locators 52 in locator plate 54. This is best seen in FIGS. 8 and 9 where the locators 52 are indicated as being secured in locator plates 54 secured to the pallet 14 by an extended portion 51 and the screws 53. The locator plates 54 also have locator grooves 55 which will receive the locator projections 56 which extend upwardly from the locator elements 35 fixed on the shuttle arms 16 and 19 for purposes of locating the pallet 14 on the shuttle arms. This is best seen in FIG. 11. It will be noted in conjunction with FIG. 7 that base 49 includes dog type switches 77 which in conjunction with the usual solenoid valves and timing mechanisms will determine the flow of hydraulic fluid to the fluid channels 41 and 42 in the central core section 75 of shuttle housing for the purpose of raising and lowering the shuttle arms 16 and 19 in conjunction with the travel position of the index table 13.

Figure 10:
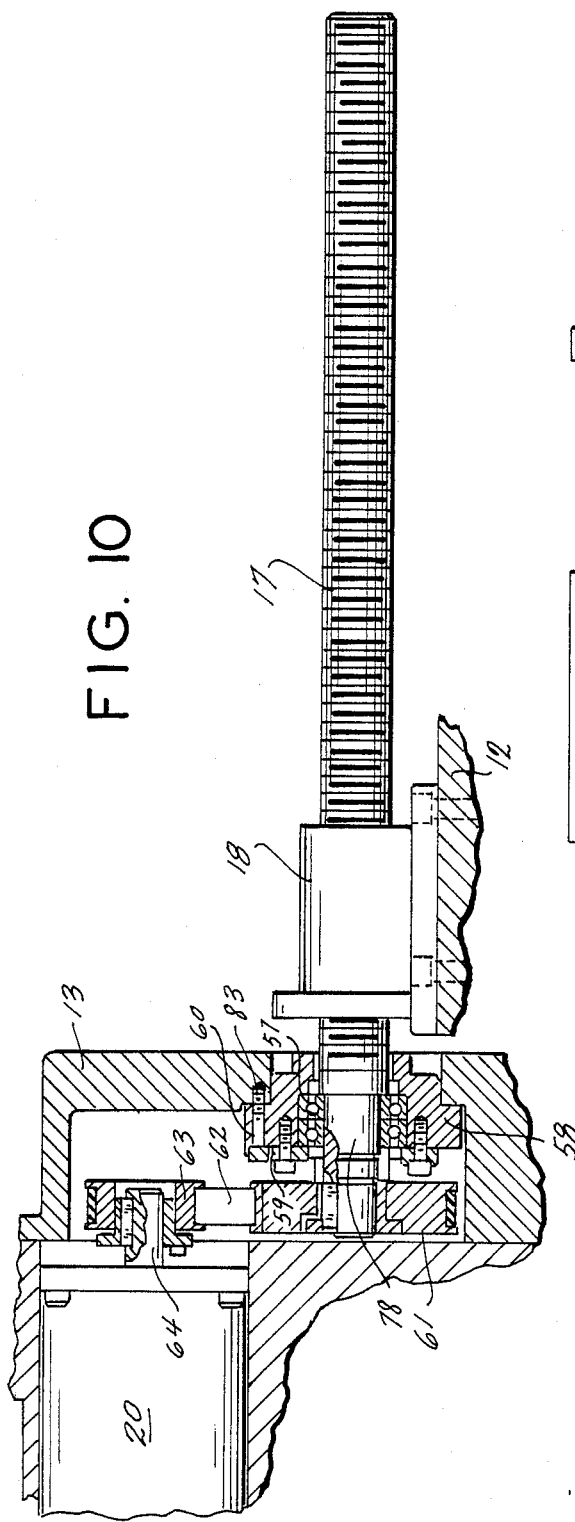
FIG. 10 is a fragmentary view and partially in section illustrating the drive mechanism for the indexing table.

The drive means for moving the index table 13 over the ways 30 and 31 is shown in FIG. 10. The electric motor 20 with a shaft 64 has a pulley 63 secured thereto. The pulley 63 will drive the belt 62 which in turn will drive the pulley 61 which is secured to an end portion 78 of the screw shaft 17. The screw shaft 17 is rotatably mounted in the index table 13 through the bearings 57 and a bearing housing 58 with the bearings retained by a lock washer 59 and a screw 60. The bearing housing 38 is fastened to the index table 13 by a screw 83. As the nut 18 is fastened to the horizontal machine tool bed 12 the rotation of the screw shaft 17 will cause the index table 13 to move in a recipiocal manner in relation thereto.

OPERATION

Figure 12:
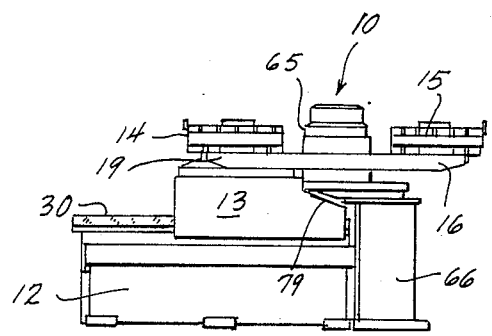
FIGS. 12–17 are views in side elevation illustrating a sequence of operation of the rotary shuttle in conjunction with the machine tool indexing table.
Figure 13:
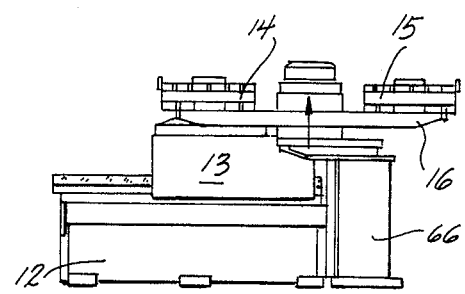
Figure 14:
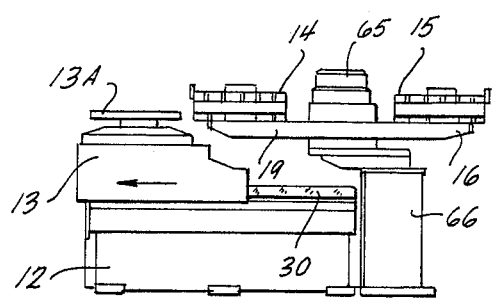
Figure 15:
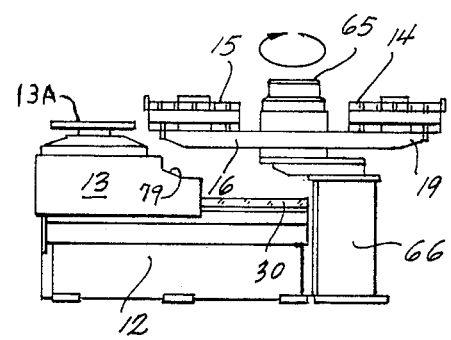
Figure 16:
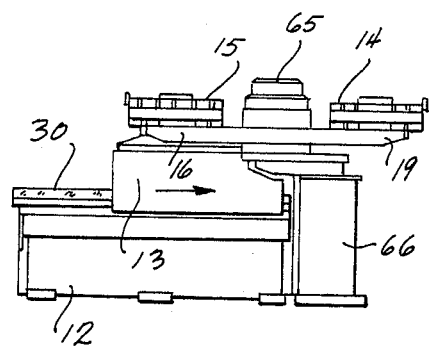
Figure 17:
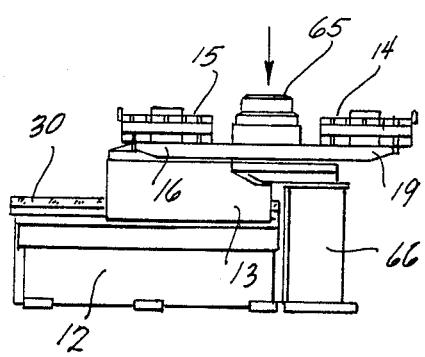

A better understanding of the advantages of the rotary shuttle mechanism 10 will be had by a description of its operation in conjunction with machine tool 11. This is best illustrated in the sequence operation illustrated in FIGS. 12-17. It will be assumed that the pallet 14 shown in FIG. 12 has a workpiece thereon (not shown) which has already been worked upon by the machine tool 11. This workpiece will have been delivered to the shuttle mechanism by lateral movement of the index table 13 over the horizontal ways 30 and 31. The index table 13 with the upward table 13A will straddle between the lowered shuttle arms 19. This is the position shown in FIG. 12 for the indexing table which will have locator projections 56 aligned with locator grooves 55. Switching mechanisms such as the switch dogs 77 will be activated to effect a flow of pressurized liquid into line 41 and opening 44 to cause a raising of the central post 65. This will also cause the arms 19 to raise, lifting the pallet 14 off of the index table 13. It should be pointed out that the preferred distance of raising the shuttle arms 19 and 16 is approximately 1 inch. This raising of the shuttle is depicted in FIG. 13 by the direction arrow. With the pallets 14 and 15 in the raised position from the index table 13 the index table 13 will move in a transverse manner over the horizontal bed 12 and to a position indicated in FIG. 14. This motion will be effected by actuation of the electric motor 20 and accordingly screw shaft 17. With the index table 13 moved away from the arcuate path of travel of the pallet 14, the shuttle mechanism 10 will be activated to rotate 180° illustrated in FIG. 15 by the direction arrow. This rotation will be effected by actuation of hydraulic motor 27 which will cause drive pinion 32 to travel over the stationary shuttle gear 28. Pallets 14 and 15 now are interchanged as indicated in FIG. 15. Referring to FIG. 16, the index table 13 will return to its position adjacent to shuttle base 66. At this time, the shuttle mechanism with its shuttle arms 16 and 19 will be lowered as indicated in FIG. 17. As previously indicated, this lowering of the shuttle arms will be effected by causing hydraulic fluid to enter into opening 45 between shuttle carriage 71 and the piston 37 while venting the fluid channel 41 and the opening 44. This lowering of the shuttle arm 19 will cause pallet 15 to be seated upon the table portion 13A of index table 13 by engagement of conical locators 48 in the receiving locators 52 of the pallet 15. This is shown in FIG. 17. After this placement, the index table 13 with the new workpiece will move again in a transverse manner over the ways 30 and 31 to a position immediately in front of the machine tool vertical column 22 for the purposes of being acted upon by a tool in the tool spindle 21. After the workpiece is operated on the pallet 15, it will again be returned to the shuttle mechanism 10 by the index table 13 as illustrated in FIG. 12. This then is a complete cycle of the shuttle mechanism 10 in conjunction with the index table 13 which in effect provides a workpiece changer for the machine tool. The pallet interchange will then be repeated through the previously indicated sequence.

It should be pointed out that there are several important features of the shuttle mechanism 10 which will be apparent in the previous description including the operation. One of the inherent disadvantages of a rotary shuttle in comparison to a linear shuttle is the fact that it usually requires more floor space. However, in this instance it will be seen that the use of an offset post section 65 with respect to shuttle base 66 permits a pallet 14 or 15 to be positioned more closely in conjunction with an index table 13. This is aided by a cutout section 79 in index table 13. Another advantage of shuttle mechanism 10 is the fact that it contains no mechanization for moving the pallets 14 and 15 off and on to the shuttle arms 16 and 19 in conjunction with the indexing table 13. In the prior art, some type of mechanization was required to effect the transverse or horizontal movement of the pallets between a shuttle and an indexing table. The indicated movement of the pallets with the shuttle mechanism 10 of this invention is effected by merely raising and lowering the shuttle arms 16 and 19. It should also be appreciated that precise location of the pallets 14 or 15 with respect to their placement on the shuttle arms 16 and 19 as well as on the index table 13A is provided. This is effected between the pallets 14 and 15 and the index table 13A as well as between the pallets 14 and 15 and the shuttle arms 16 and 19 by the previously mentioned locators 48 and 56 acting in conjunction with the respective locators 52 and 55 in the locator plates 54. This precise positioning of the pallets 14 and 15 with respect to the shuttle arms 19 and 16 and the index table 13A affords fast and efficient transfer of the pallets between the index table 13 and the rotary shuttle 10.

Figure 1:
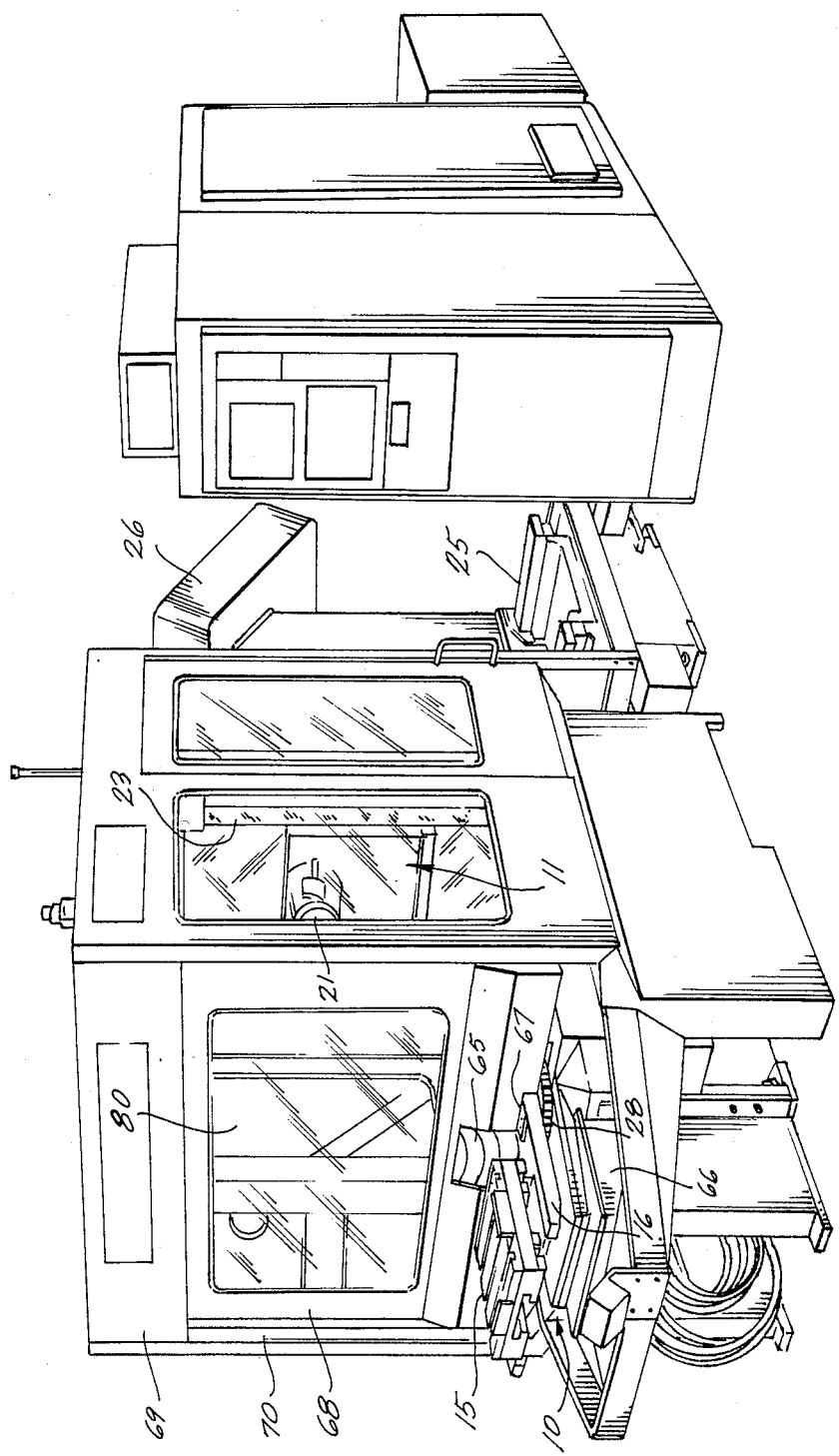
FIG. 1 is a perspective view of a machine tool incorporating the present invention.

An optional advantage of the shuttle mechanism 10 of this invention is seen in FIG. 1. Shuttle mechanism 10 can accommodate a shielding type gate 68 which can be affixed to the rotating shuttle mechanism such as over the central section 67 and central post 65. Accordingly, it will be rotated with the shuttle arms 16 and 19 so that when one of the pallets such as 14 or 15 is housed within the enclosure 69 the gate 68 will be aligned in and close the doorway 70 of the enclosure 69. If desired, and for observation purposes a transparent panel section 80 can also be provided in the gate 68.

The synchronization of the various drive means such as the hydraulic motors 20 and 27 as well as the pressurization and venting of the fluid lines 41 and 42 can be accomplished through the use of common control switches and solenoid valves which can placed under the control of a computerized timed control center. This makes the shuttle mechanism of this invention easily accommodated in a machine tool center wherein the operations are highly precise and effected in an automated computerized manner.

While a particular screw type drive as represented by stationary nut 18, screw shaft 17 and motor 20 has been described for moving index table 13 in conjunction with shuttle mechanism 10, any suitable drive arrangement could be employed such as a rack and pinion arrangement. Further, while specific geometric types of engaging locators such as 55 and 56 are illustrated for positioning the pallets 14 and 15 on the support arms 16 and 19, any other type of interfitting locators could be utilized of various geometric configurations.

It will thus be seen that through the present invention there is now provided a rotatry shuttle mechanism which requires a minimum amount of floor space yet obviates the requirement for mechanization in connection with the shuttle for moving pallets on and off of the shuttle. Precise location is afforded for positioning the pallets with respect to both the shuttle mechanism and the indexing table making the shuttle mechanism of this invention highly efficient.

Although the illustrative embodiment of the invention has been described in detail for the purpose of disclosing a practical operative structure whereby the invention may be practiced advantageously, it is to be understood that the particular apparatus described is intended to be illustrative only and that the novel characteristics of the invention may be incorporated in other structural forms without departing from the spirit and scope of the invention as defined in the sub-joined claims.

I claim:

1. A machine tool having a movable work supporting table and a shuttle mechanism for exchanging workpieces with the work supporting table comprising; an enclosure enclosing the work area of the machine tool including the work supporting table; a frame; an arm rotably mounted on said frame, a pair of work supports at opposite ends of said arm in position so that when one of said supports is in a loading station outside of said enclosure the other work support is an exchange station within said enclosure for loading a new workpiece into the work supporting table or removing a finished workpiece from the work supporting table; a panel extending upwardly from said arm to form one side of said enclosure; the center of said panel being coincident with the axis of rotation of said arm, and means connected for rotating said arm in increments of 180° for exchanging workpieces between the loading station and the exchange station and said panel will rotate with said arm to again close the opening in said enclosure upon the completion of a rotary movement; means connected for moving said work table into said exchange station to position the finished workpiece thereon for engagement by one of the work supports on said arm; and means connected for raising said arm to engage the finished workpiece and lift it off of said work table and for lowering said arm to place a new workpiece moved into the exchange station on the work supporting table.

2. The method of exchanging workpieces in a machine tool having a work area enclosed by an enclosure and having a movable work supporting table and a shuttle mechanism for exchanging workpieces with the work supporting table; comprising loading an unfinished workpiece onto the shuttle mechanism at a loading station; moving the work supporting table into an exchange station to move the finished workpiece thereon into engagement with the shuttle mechanism; unclamping the workpiece from the work table; raising the shuttle mechanism to lift the finished workpiece off of the work table, rotating the shuttle mechanism to move the finished workpiece from the exchange station to the loading station for removal therefrom while at the same time moving the unfinished workpiece from the loading station to the exchange station; lowering the shuttle mechanism to place the unfinished workpiece on said table; clamping the workpiece to said work table; moving the work table out of the exchange station into the machine tool work area for the performance of a machining operation on the workpiece; and rotating one panel of the enclosure with the rotation of said shuttle mechanism for admitting the new workpiece into the work area and then returning the panel to the closed position upon the completion of the rotary movement so that the work area is fully enclosed during a work operation.

* * * * *

REEXAMINATION CERTIFICATE (3985th)

United States Patent [19]
Mattson

[11] B1 4,673,076
[45] Certificate Issued Feb. 1, 2000

[54] ROTARY SHUTTLE FOR MACHINE TOOLS

[75] Inventor: Clyde E. Mattson, Waukesha, Wis.

[73] Assignee: Kearney & Trecker Corporation, Milwaukee, Wis.

Reexamination Request:
No. 90/005,249, Feb. 8, 1999

Reexamination Certificate for:
Patent No.: 4,673,076
Issued: Jun. 16, 1987
Appl. No.: 06/647,116
Filed: Sep. 4, 1984

[51] Int. Cl.$^7$ .................................................. B65G 47/00
[52] U.S. Cl. ..................................... 198/346.2; 198/346.1; 198/950; 414/222.07; 414/744.3; 414/806
[58] Field of Search ......................... 414/222.01, 222.04, 414/222.05, 222.06, 222.07, 223.01, 226.05, 744.1, 744.2, 744.3, 806, 807; 198/346.1, 346.2, 339.1, 414, 950; 29/33 P, 563; 409/134

[56] References Cited

U.S. PATENT DOCUMENTS 4,373,406   2/1983   Pietrowski ................................. 74/613

FOREIGN PATENT DOCUMENTS 23 65 033   7/1975   Germany .

*Primary Examiner*—Donald W. Underwood

[57] ABSTRACT

A rotary shuttle (10) for a machine tool (11) in which no power mechanism is required for moving the pallet (14, 15) with the workpiece off of the shuttle (10) and on to the machine tool worktable (13A) or for withdrawing a pallet (14,15) with the completed workpiece on it off of the machine tool worktable (13A) and back on to the shuttle (14,15). A rotatable shuttle (10) is presented with a workpiece support which can also be raised and lowered with pallets (14,15), which in conjunction with an indexing table (13) moves workpieces between the worktable (13A) and a workpiece support (16,19). A frame (66) of the shuttle mechanism (10) includes an offset rotatable section (65) which is arranged to extend over a portion (79) of the indexing table (13) with the shuttle mechanism (10) including support arms (16,19) in conjunction with the offset rotatable section to extend over a portion of the indexing table (13). In this manner, the rotation as well as raising and lowering of the workpiece support can effect the placement of a workpiece from the workpiece support on to an indexing table as well as removal therefrom of the workpiece which has been operated on without the requirement of a power mechanism for moving a pallet (14,15) between the workpiece support (16,19) and the indexing table (13).

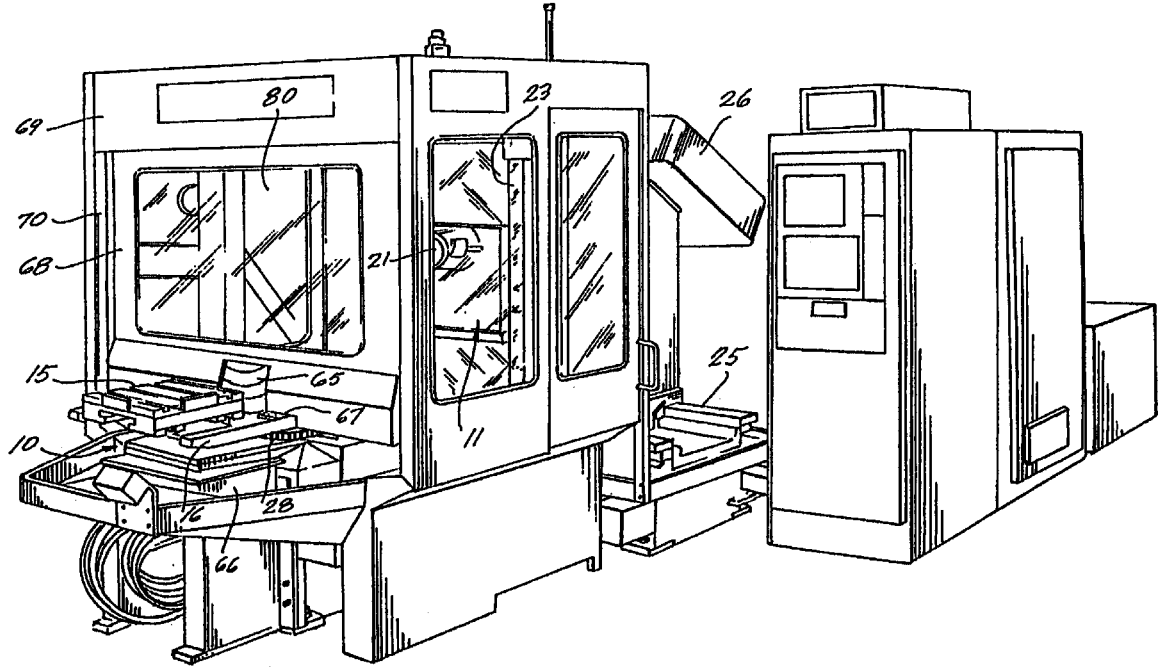

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1 and 2 is confirmed.

* * * * *